Patented Feb. 22, 1927.

1,618,372

UNITED STATES PATENT OFFICE.

MAX ENGELMANN, OF WILMINGTON, DELAWARE, ASSIGNOR TO E. I. DU PONT DE NEMOURS & COMPANY, OF WILMINGTON, DELAWARE, A CORPORATION OF DELAWARE.

DISINFECTANT AND PROCESS OF MAKING SAME.

No Drawing. Application filed July 25, 1925. Serial No. 46,180.

This invention relates to compositions comprising organic mercurials in a highly efficacious physical form, and to processes of making such compositions. Organic mercury compounds, which constitute perhaps the most effective seed disinfectants, fungicides, and insecticides, are ordinarily employed either in water solution as alkali-metal salts or in dust form. The great potency of these mercurials makes it advisable, if they are to be used as dusts, to dilute them with inert materials or vehicles of alkaline or neutral reaction; and this is done as a rule by mixing the finely divided inert material with the mercury compound.

I have now discovered that a peculiarly advantageous combination of an organic mercury compound and an inert material, with the mercury compound in an available and highly reactive condition, may be obtained by synthesizing the organic mercury compound in the presence of the inert material in finely subdivided form to thereby form a coating or deposit of organic mercury compound on each individual particle of the inert material. The inert material should preferably be relatively insoluble in water, but may have an acid or neutral reaction in the presence of water.

In general, the new product may be described as a finely subdivided non-alkaline inert material having a coating or deposit of an active organic mercury compound on the individual particles thereof. This new product has been found to be far superior in effectiveness as a seed disinfectant to an equal weight of the mercury compound merely mixed and ground with the inert material.

My invention may be illustrated by the following examples, but it will be understood that the invention is not limited to the details and conditions mentioned therein.

*Example 1.*

50 parts of mercuric acetate are dissolved in 1500 parts of water and 500 parts of kaolin are added under agitation. After adding a solution of 23 parts of ortho-nitrophenol sodium in 150 parts of water the suspension is heated up to 80° C. for about 4 hours. The reaction is finished when the addition of sodium sulphide solution fails to produce a black precipitate of mercury sulphide. The residue is filtered off after cooling, dried, and reduced to a fine powder.

*Example 2.*

To a solution of 75 parts of mercuric bichloride in 1500 parts of water 500 parts of infusorial earth are added under agitation. The mercuric salt is then converted into mercuric oxide by adding a 20 per cent solution of sodium hydroxide until a test sample indicates a very slight alkaline reaction to litmus paper. After the addition of 38 parts of ortho-chlorphenol the mixture is heated up to 80° centigrade for about 4 hours or until a test sample gives, with sodium sulphide solution, no black mercuric sulphide. The residue is filtered off after cooling, dried, and powdered.

*Example 3.*

In a suspension of 500 parts of powered charcoal in 2000 parts of water, 50 parts of mercuric acetate are dissolved and 23 parts of beta-naphthol are added under good agitation. The mixture is heated up to 75° C. for about 3 hours after which time all mercuric acetate is converted into beta-naphthol mercuric acetate. The residue is filtered off after cooling and dried.

By proceeding in the manner described in the above examples, the kaolin, infusorial earth, and charcoal, respectively, will be obtained with a thin coating or film of an organic mercury compound which is substantially insoluble in water. Instead of the particular organic compounds mentioned in the above examples, any other organic derivatives which can be converted into organic mercurials may be used; and in place of the inert materials mentioned above, there may be used, for example, barium sulfate, calcium phosphate, etc.

The inert materials used should be finely subdivided for seed-disinfectant purposes. I prefer to use these materials in such degree of subdivision that 80% thereof will pass through a 200 mesh screen, but it will be understood that my invention is not limited with respect to the size of the particles of the inert materials employed, since the increased efficacy of the mercury compound is obtained irrespective, to a great extent, of the size of the particles on which the mercury compound is deposited.

The final product or dust produced by the above described process should be sufficiently finely subdivided, that a substantial coat or layer thereof will remain on seeds and foliage to which the dust has been applied.

I claim:

1. A new seed disinfecting composition comprising a finely divided non-alkaline solid material the particles of which are coated with an organic mercury compound having disinfecting properties.

2. A disinfecting composition applicable as a dust to seeds, comprising a finely divided non-alkaline solid vehicle relatively inert with respect to the material to be disinfected, and an organic mercury compound having disinfecting properties, at least a substantial proportion of said mercury compound being deposited on, and firmly adherent to, the particles of said solid vehicle.

3. As a new seed disinfectant, a finely divided solid vehicle of non-alkaline character carrying as a deposit on the individual particles thereof, a mercuri-phenol compound.

4. The process of making a new seed disinfectant containing an organic mercury compound relatively insoluble in water, which comprises synthesizing said mercury compound in an aqueous medium in which a finely divided non-alkaline solid is suspended, thereby forming a coating or deposit of said mercury compound on the particles of said solid, and then filtering, drying, and powdering the mass of coated particles.

5. The process of making a new seed disinfecting composition containing an organic mercury compound which comprises synthesizing the organic mercury compound in a liquid medium in which said organic mercury compound is relatively insoluble and in which there is temporarily suspended a finely divided solid of non-alkaline character, thereby causing at least part of said mercury compound to become deposited on the particles of solid suspended in said medium, and then recovering the coated particles from said liquid medium.

6. A disinfecting composition applicable as a dust to seeds which comprises a finely divided non-alkaline solid vehicle relatively inert with respect to the material to be disinfected, and a mercurized-chloro-phenol compound, at least a substantial proportion of which is deposited on, and firmly adherent to, the particles of said solid vehicle.

7. The process of making a new seed disinfectant containing a mercurized chloro-phenol compound relatively insoluble in water, which comprises synthesizing said mercury compound in an aqueous medium in which a finely divided non-alkaline solid is suspended, thereby forming a coating or deposit of said mercurized chloro-phenol compound on the particles of said solid, and then filtering, drying, and powdering the mass of coated particles.

8. Seeds having intimately associated therewith a composition comprising a finely divided non-alkaline solid vehicle relatively inert with respect to the material to be disinfected, and an organic mercury compound having disinfecting properties, at least a substantial proportion of said mercury compound being deposited on, and firmly adherent to, the particles of said solid vehicle.

9. Seeds coated with a disinfectant containing an organic mercury compound relatively insoluble in water, said organic mercury compound having been synthesized in an aqueous medium in which a finely divided non-alkaline solid is suspended, whereby a coating or deposit of said mercury compound is formed on the particles of said solid.

10. Seeds coated with a disinfectant containing a mercurized chloro-phenol compound which has been formed by synthesizing said mercury compound in an aqueous medium in which a finely divided non-alkaline solid is suspended, whereby a coating or deposit of said mercurized chloro-phenol compound has been formed on the particles of said solid.

In testimony whereof I affix my signature.

MAX ENGELMANN.